United States Patent
Mahy

[11] Patent Number: 5,872,898
[45] Date of Patent: Feb. 16, 1999

[54] METHOD AND APPARATUS FOR CALCULATING COLOR GAMUTS

[75] Inventor: Marc Mahy, Wilsele, Belgium

[73] Assignee: Agfa Gevaert N.V., Mortsel, Belgium

[21] Appl. No.: 706,028

[22] Filed: Aug. 30, 1996

Related U.S. Application Data

[60] Provisional application No. 60/006,204, Nov. 3, 1995.

[30] Foreign Application Priority Data

Sep. 15, 1995 [EP] European Pat. Off. ............... 95114591

[51] Int. Cl.$^6$ ............................. H04N 1/46; G03F 3/08; G06F 15/00
[52] U.S. Cl. .......................... 395/109; 358/500; 358/504; 358/515; 358/518; 358/530
[58] Field of Search ...................................... 395/109, 112, 395/114, 115; 358/500, 518, 519, 520, 521, 522, 523, 524, 530, 504, 515; 382/166, 167, 168

[56] References Cited

U.S. PATENT DOCUMENTS

| | | | |
|---|---|---|---|
| 5,384,901 | 1/1995 | Glassner | 395/131 |
| 5,502,580 | 3/1996 | Yoda et al. | 358/518 |
| 5,619,427 | 4/1997 | Ohkubo | 358/518 |

*Primary Examiner*—Edward L. Coles
*Assistant Examiner*—Mark Wallerson
*Attorney, Agent, or Firm*—John A. Merecki

[57] ABSTRACT

A method and an apparatus for obtaining a gamut description of a multidimensional color reproduction device. The method is based on the transformation of several types of colorants boundaries that map to the boundaries of the color gamut of the device in color space.

6 Claims, 3 Drawing Sheets

METHOD AND APPARATUS FOR CALCULATING COLOR GAMUTS

DESCRIPTION

This application claims benefit of Provisional No. 60/006, 204, filed Nov. 3, 1995.

FIELD OF THE INVENTION

The present invention relates to devices and methods for image rendering by means of multidimensional color reproduction devices.

BACKGROUND OF THE INVENTION

The independent values with which the color device can be addressed are called colorants or inks. For purposes of generality, the physically achievable values for these colorants range from 0 to 100%. A color reproduction device with n colorants will be called a printer or an n-ink process. A typical device we have in mind is a multidimensional color printer with n colorants such as a cmyk offset printing press, but the invention can also be applied to other devices such as color displays, color photography or slide makers.

With colorants space is meant an n-dimensional space with n the number of independent variables with which the printer can be addressed. In the case of an offset printing press the dimension of the space corresponds to the number of inks of the printer. With color space is meant a space that represents a number of quantities of an object that characterize its color. In most practical situations, colors will be represented in a 3-dimensional space such as the CIE XYZ space. However, also other characteristics can be used such as multispectral values based on filters that are not necessarily based on a linear transformation of the color matching functions to represent color. A typical example is an n-dimensional space of which the axes correspond to densities.

With colorants gamut or colorant domain is meant the delimited space in colorant space of colorant combinations that are physically realizable by a given printer, taking into account possible extra limitations on colorant combinations. In this invention it is supposed that colorant limitations are preferentially specified by mathematical formulas that describe the boundaries of the desired colorant gamut.

The colorant gamut of a cmyk offset press for example is delimited by a linear condition that limits the sum of the four colorant (for example to 340%). A printer model is a mathematical relation that expresses color values in function of colorant for a given printer. The variables for the colorant are denoted as $c_1, c_2, \ldots c_n$ with n the dimension of the colorant space. An n-ink process is completely characterized by its colorant gamut with a number of colorant limitations and the printer model. Because of this close relationship between an n-ink process and the printer model, the operations typical for a printer model are also defined for the n-ink process. With inverting an n-ink process is meant that the corresponding printer model is inverted. The transformation of an n-ink process to color space on the other hand is equivalent to the transformation of the corresponding colorant domain to color space by making use of the printer model. If an n-ink process is given with colorant limitations in the colorant domain and if an m-ink process is deduced from this n-ink process by setting n-m colorant to constant values in the printer model of the n-ink process, the colorant limitations are inherited by this m-ink process if the colorant gamut of the m-ink process is restricted by colorant limitations obtained by setting the n-m colorant in the colorant limitations of the colorant gamut of the n-ink process to their constant values.

Extracting an m-ink process out of an n-ink process with m<n, means that n-m out of the n colorant in the printer model are replaced by a constant value. The colorant of such an m-ink process vary between the minimum and maximum values they can have according to the colorant gamut of the n-ink process and the colorant limitations are inherited by the m-ink process. The m-ink process is called the extracted m-ink process of the n-ink process.

If an m-ink process is extracted from an n-ink process, and the n-m out of the n colorant in the printer model of the n-ink process are replaced by their minimum or maximum value as defined by the colorant gamut of the n-ink process, the m-ink process is called an m-ink boundary process of the n-ink process. In general there are $$\frac{n!}{(n-m)!m!} 2^{n-m}$$

m-ink boundary processes of an n-ink process. The colorant in the colorant gamut of an m-ink boundary process vary between the minimum and maximum values they can have according to the colorant gamut of the n-ink process and the colorant limitations are inherited by the m-ink process. With color gamut is meant a delimited region in color space, containing colors that are physically realizable by a given printer, taking into account possible extra limitations on colorant combinations.

A color gamut is completely determined by its boundaries. In a 3-dimensional color space these boundaries are surfaces, and hence there will be surfaces in colorant space that map to the color gamut boundaries. In general several kinds of colorant surfaces should be taken into account, but for well-behaved printers the color gamut is, by definition, exactly determined by the transformation of the colorant domains of the 2-ink boundary processes of the n-ink process to color space. It can be shown that this condition is equivalent with saying that in a n-ink process, a colorant combination lies inside the color gamut if there are at least three colorant that can be changed both positively as negatively. Such surfaces in colorant space are called physical colorant boundaries that are transformed by the printer model to the physical color boundaries in color space. The envelope of the physical color boundaries determines the boundaries of the physical color gamut of the n-ink process. In the case of an s-dimensional color space, the dimension of the boundaries is s-1. Physical colorant boundaries correspond in this case to the domains of the (s-1)-ink boundary processes of the n-ink process. The physical color boundaries are obtained by transforming the domains of the (s-1)-ink boundary processes of the n-ink process to color space.

The color gamut of a printer is certainly one of its most important characteristics. An explicit representation of this gamut is highly desirable, for example, to enable the optimal reproduction of images that contain colors that fall outside the color gamut of the printer.

Because our invention is based on the use of a printer model, a few more words of explanation are given on the subject of printer models.

The Neugebauer Equations

Different mathematical expressions have been proposed to model printing processes, along which the Neugebauer equations are certainly the most known ones.

The Neugebauer equations reflect how color originates in halftone printing. The printing with three inks $c_1$, $c_2$ and $c_3$ by means of three halftone screens results theoretically in eight possible combinations of colorant overlap, called the Neugebauer primaries. If the size of the halftone dots is small enough not to be resolvable by the eye, the resulting color is a weighted sum of the tristimulus values of these primaries. For a 3-ink process, the Neugebauer equation for the X tristimulus value is given by $$X_{(c1,c2,c3)} = a_W X_W + a_1 X_1 + a_2 X_2 + a_3 X_3 + a_{12} X_{12} + a_{13} X_{13} + a_{23} X_{23} + a_{123} X_{123}$$

If it is assumed that the relative positions of the halftone dots are random, the Neugebauer equations can be calculated from the Demichel equations that predict the fraction of each combination of the three inks as a function of their respective dot percentages $c_1$, $c_2$ and $c_3$, and this leads to the Neugebauer equations in their most often encountered form:

$$a_W = (1-c_1)(1-c_2)(1-c_3)$$

$$a_1 = (c_1)(1-c_2)(1-c_3)$$

$$a_2 = (1-c_1)(c_2)(1-c_3)$$

$$a_3 = (1-c_1)(1-c_2)(c_3)$$

$$a_{23} = (1-c_1)(c_2)(c_3)$$

$$a_{13} = (c_1)(1-c_2)(c_3)$$

$$a_{12} = (c_1)(c_2)(1-c_3)$$

$$a_{123} = (c_1)(c_2)(c_3)$$

in which $c_1$, $c_2$ and $c_3$ represent the dot percentages of the three inks. The equations for the Y and Z values are obtained by replacing the X values by the corresponding Y and Z values respectively. The extension of the Neugebauer equations for n inks is straightforward.

According to one interpretation, the Neugebauer equations predict the X, Y and Z tristimulus values by means of trilinear interpolation from the corresponding tristimulus values of the 8 Neugebauer "primaries". If the Neugebauer equations are used as multilinear interpolation formulae, they can be used to model any color device in any color space.

Working out the Demichel coefficients in the Neugebauer equations and rearranging the terms results in the following set of polynomial expressions:

$$X = k_0 + k_1 c_1 + k_2 c_2 + k_3 c_3 + k_{12} c_1 c_2 + k_{13} c_1 c_3 + k_{23} c_2 c_3 + k_{123} c_1 c_2 c_3$$

$$Y = l_0 + l_1 c_1 + l_2 c_2 + l_3 c_3 + l_{12} c_1 c_2 + l_{13} c_1 c_3 + l_{23} c_2 c_3 + l_{123} c_1 c_2 c_3$$

$$Z = m_0 + m_1 c_1 + m_2 c_2 + m_3 c_3 + m_{12} c_1 c_2 + m_{13} c_1 c_3 + m_{23} c_2 c_3 + m_{123} c_1 c_2 c_3$$

This leads to an interpretation of the Neugebauer equations as a set of "interpolating polynomials". The coefficients can be calculated from the X, Y and Z values of the eight Neugebauer primaries, or they can be obtained by means of a regression technique on a large set of color-colorant combinations. The Neugebauer equations can be graphically represented. For a given color XYZ, each one of the three Neugebauer equations represents a curved surface in the colorant space. The situation is depicted for a common cmy printing process in FIG. 1.

Improving the Precision of the Neugebauer Printing Model.

Real printing processes seldom behave exactly according to the physical model on which the Neugebauer equations are based. Various modifications of the Neugebauer equations have therefore been suggested to improve their precision, among which the n-modified and the spectral Neugebauer equations are only cited. The interpretation of the Neugebauer equations as interpolating polynomials leads to the introduction of additional higher order terms, while their interpretation as trilinear interpolation suggests the concept of "piece-wise trilinear interpolation" to improve the accuracy of the model. The latter method is also known under the name of cellular or localized Neugebauer equations ("LNE"). The different subdomains are called the Neugebauer cells. More information on these models is found in the article by Rollestone Robert and Balasubramanian Raja (1993), "Accuracy of Various Types of Neugebauer Model", 1993 IS&T and SID's Color Imaging Conference: Transforms & Transportability of Color, pp. 3–37.

Calculation of the Color Gamut Boundaries.

An example of a first heuristic method is described in "Derivation of 3-dimensional gamut descriptions for graphic arts output devices", presented at TAGA 94 by William Kress and Michael Stevens.

According to this method, the colorant gamut is sampled and the resulting colorant combinations are evaluated by means of a printer model. The resulting colors are then classified in "bins" of, for example, different CITE lightness values. The envelope of the colors that lie within one such a "bin" reflects an approximation of the shape of the color gamut at the corresponding constant lightness value. The method is conceptually simple, but has a number of drawbacks. In the first place a large set of samples in the colorant gamut is needed to achieve a reasonable description of the color gamut boundaries. Hence this method is quite slow and the processing time for this method increases exponentially with the number of colorant. A second problem is that from a mathematically point of view it is difficult to determine exactly the boundaries of the color gamut per lightness level from a set of discrete points. Particularly the detection of holes or several contours per lightness level is rather complicated, if not impossible. Moreover, the method is not always robust because it may fail to detect the exact contours if the sampling distance in the colorant space is too large so that neighboring points ih colorant space are transformed to colors in color space that are not seen as connected by the color gamut boundary detection method.

According to a second approach, the gamut boundaries are "explored" in one of the color spaces using heuristic techniques. A "start color" is first selected that is known to fall inside the reproducible color gamut. This color is then incrementally changed keeping two of the three dimensions (for example hue and lightness) constant. The changed color is then separated and the colorant values are evaluated. If they fall within the colorant gamut, the corresponding color is assumed to fall within the printable color gamut and a next increment is added to the color. If, however, the set of colorant values falls outside the colorant gamut, a point of the colorant gamut boundary is assumed to lie in between the current and the previous separated color. By returning to the last color that still was within the color gamut and making the color increment smaller, the exact position of the point of the color gamut boundary can be determined with any desired precision. By selecting a sufficient number of "start colors" and a sufficient number of directions for the color change, the boundaries of the color gamut can be reasonably estimated. This method, however, also has a number of drawbacks. The method mainly works in color space, so the printer model has to be inverted.

Till now this is almost always done by iterative methods. If several colorant combinations give rise to the same color, only one solution will be found. If that solution lies outside the colorant gamut, wrong conclusions will be drawn for the color gamut if at least one of the other solutions would be inside the colorant domain. A second problem is that it can fail when the color gamut is concave or when per cross section several contours have to be determined. A third drawback is that the heuristic nature of the procedure leads to very long calculations since many more points need to be evaluated than are obtained for the description of the gamut boundary itself. A faster version of this method is represented in the article "The color gamut obtainable by the combination of subtractive color dyes", Journal of Imaging science, Vol. 30, No. 1, 1986 by N. Otha. Per lightness plane a border point is searched for and the next border point is detected by looking radially around this point. From this new border point the next border point is detected again by radially looking around it. This last procedure is repeated until the first border point is reached again. In this way concave contours can be detected, but nevertheless this iterative method is still quite slow, the printer model has to be inverted and multiple contours are not detected.

A third approach is described in the article by Masao Inui, "Fast Algorithm for Computing Color Gamuts", Color Research and Application, Vol. 18, No. 5, October 1993. In order to calculate a gamut descriptor of a 3-ink process, the following procedure is performed:

Step 1: The lightness values at the eight vertices of the dye delimited solid are calculated for zero and maximum amounts;

Step 2: For a given lightness, the locations of several equilightness points on the edges of the dye delimited solid are computed;

Step 3: Loci connecting these points on the faces of the dye delimited solid are computed;

Step 4: The loci are mapped into color space to produce the boundary of the color gamut.

According to the article, the loci of the equilightness points on the edges of the dye solid are computed as follows. Since at the edge of the color solid one of the colorant is equal to its minimum or maximum value, there are effectively only two colorant available as variables to achieve the desired lightness value. One of these variables can be used as a parameter, leaving only one value left to iterate on. One dimensional Newton-Raphson is used to determine the value of this remaining variable that results in the desired lightness value.

The above method is claimed to work very fast, but its weak point is that it relies on Newton Raphson iteration. Depending on the printer model, there may be several possible solutions, but only one solution will be found with iterative methods. Nevertheless, if several start points would be used to find all the solutions, it is not possible to know which colorant combination belongs to (which one of) the previous solution(s), i.e. no information is available about the connectivity between the different solutions.

Moreover, for unconventional processes some boundaries of the color gamut are not obtained by mapping the edges of the colorant cube to color space. An example of such a 3-ink process was found in printing yellow (y), cyan (c) and green (g) inks. The XYZ and corresponding CIELAB values of the Neugebauer primaries of this process are given in Table 1. The first column corresponds to the 8 possible combinations of ink overlap. An evaluation reveals that for this process approximately half of the realizable colorant combinations yields colors that lie outside the color gamut as it is defined by the mapping of the edges of the colorant cube to color space. FIG. 2 shows a cross section of the color gamut in CIELAB at a constant L* value. The solid lines correspond to the intersection with the mapping of the edges of the colorant cube to color space. The shaded area represents colors that lie outside the gamut defined by the physical boundaries. The outer curve represents the intersection with the object color solid, also known as the MacAdam limits.

TABLE 1

XYZ and CIELAB values of the Neugebauer primaries of a non-conventional 3-ink process.

|  | X | Y | Z | L* | a* | b* |
| --- | --- | --- | --- | --- | --- | --- |
| white | 100.0 | 100.0 | 100.0 | 100.0 | 0.0 | 0.0 |
| y | 64.8 | 66.2 | 10.5 | 85.1 | −3.1 | 80.1 |
| g | 19.7 | 29.8 | 7.0 | 61.5 | −43.1 | 51.2 |
| c | 25.7 | 33.6 | 69.2 | 64.7 | −29.7 | −37.8 |
| yg | 14.1 | 19.6 | 1.7 | 51.4 | −30.0 | 64.6 |
| yc | 11.1 | 19.8 | 6.9 | 51.6 | −51.0 | 34.4 |
| gc | 4.7 | 11.2 | 4.6 | 39.9 | −60.9 | 24.6 |
| ygc | 3.0 | 6.8 | 1.1 | 31.4 | −49.3 | 37.8 |

In many situations, it is not possible to print all the colorant combinations. A typical example occurs for the cmyk offset process, for which the sum of the inks is limited to 340%. For some other colorant combinations, there may also be some printing problems if three times 100% is printed on top of each other, although the total amount of colorant may be larger than 300%. To avoid such effects, several colorant limitations may be given in the colorant domain.

To determine the color gamut of a printer with a number of colorant limitations, previous methods should be adapted. Some of them can be easily extended such as the first method, but all the previously cited problems remain. However, for the last method, the iteration becomes more complex so that even in the case of simple mathematical printer models there will be multiple solutions which are difficult to find. Moreover, if all the different solutions could be found, also in this case it is almost impossible to connect the different solutions to form one or several contours.

Finally, also the extension of previous methods to more than three colorant is not always straightforward. Most methods suppose that there is a one to one relation between printers with three colorant and the color values. For printers with more than three colorant this is certainly no longer the case.

OBJECTS OF THE INVENTION.

In the invention "Method and apparatus of calculating color gamuts" with reference GV95149, filed on the same date at the EPO as this application, the color gamut was determined by transforming the physical colorant boundaries to color space. From the above explanation it is clear that no exact color gamut is obtained by taking into account only the physical colorant boundaries.

It is an object of the invention to describe all the colorant boundaries that transform to the boundaries of the color gamut for an n-ink process with n smaller or equal to the dimension of the color space.

It is an object of the invention to describe all the colorant boundaries that transform to the boundaries of the color gamut for an n-ink process with n smaller or equal to the dimension of the color space, taking into account several colorant limitations.

It is an object of the invention to describe all the colorant boundaries that transform to the boundaries of the color gamut for a 3-ink process in a 3-dimensional color space.

It is an object of the invention to describe all the colorant boundaries that transform to the boundaries of the color gamut for a 3-ink process in a 3-dimensional color space, taking into account several colorant limitations.

It is an object of the invention to describe all the colorant boundaries that transform to the boundaries of the color gamut for an n-ink process with n larger than the dimension of the color space.

It is an object of the invention to describe all the colorant boundaries that transform to the boundaries of the color gamut for a n-ink process with n larger than the dimension of the color space, taking into account several colorant limitations.

Further objects and advantages of the invention will become apparent from the description hereinafter.

SUMMARY OF THE INVENTION

The above mentioned objects are realized by the specific features according to claim 1. Preferred embodiments of the invention are disclosed in the dependent claims. The method according to the current invention is especially well suited for use in a three dimensional color space, also referred to as tristimulus color space. If colors are described in a four dimensional color space or a color space with an even higher dimension, the method according to the current invention is preferentially applied by reducing the number of dimensions to three. This may be accomplished by not using one or more dimensions, or by using the sum of two or more variables in color space, or any other function applied to such variables, such that finally three useful independent variables remain.

In a three dimensional color space, a color gamut is a solid. For describing this solid, the color gamut is preferentially intersected by a plurality of surfaces in color space. A surface is a set of points according to two degrees of freedom, and may be curved. A plane is a specific embodiment of a surface. A more accurate description of the color gamut may be obtained by intersecting it by more surfaces. For each surface, all points on the surface, which belong to the color gamut, are situated in one or more connected regions. Each such region is enclosed by a closed contour. A contour is a curve in color space, having one degree of freedom. In the most simple case, all points of the color gamut, situated on one surface, may be enclosed by just one closed contour. By specifying contours, each contour being situated in one surface, enclosing colors belonging to the color gamut of the reproduction device, the entire color gamut may be described. By knowing these contours, it may be easily decided whether a specific color belongs to the color gamut or not. Knowledge of this is important in color reproduction, in order to decide how colors outside the color gamut will be reproduced.

In a preferred embodiment, each surface is planar. In a specific embodiment, parallel planes in color space, each having a constant lightness may be used to intersect the color gamut. In that case, each closed contour is a planar closed curve, situated in a plane parallel to each other closed contour.

According to the current invention, a plurality of closed contours in color space may be constructed. We have found that it is more efficient to find curves in colorant space, corresponding to the closed contours in color space. Each curve is preferentially based on a sub-ink process, in which three inks or colorant are selected. Each curve is then transformed from colorant space to color space. Such a transformed curve gives a portion or segment of a closed contour in color space, or even the full closed contour. According to the method of the current invention, one or more contour segments may be concatenated. If "one" contour segment is "concatenated", this means that its starting point is connected with its endpoint, forming a closed contour. If two contour segments are concatenated, this means that the endpoint of the first contour segment is connected with the starting point of the second contour segment and the endpoint of the second contour segment is connected with the starting point of the first contour segment. Concatenation is preferentially done in colorant space, but it may equivalently be done in color space, after transforming the curve to color space.

In the broadest sense, Neugebauer cells are solids, as a portion from a colorant space, such that each point belonging to the colorant gamut belongs to at least one Neugebauer cell. Such Neugebauer cells may thus have common points, regions or solids. In a specific embodiment, the Neugebauer cells partition the colorant gamut in mutually disjunctive portions. This means that the intersection between each two Neugebauer cells is empty or comprises at most one surface. In a more preferred embodiment, each Neugebauer cell is a cuboid, i.e. a rectangular parallelepiped. A specific embodiment of a cuboid is a cube. The colorant gamut may be split cubes, all having the same size. In the broadest sense, "Neugebauer equations" as referred to in the current invention are equations having at least one non-linear term. A non-linear term is e.g. a quadratic term, cubic, etc. or a cross-product between two or more linear variables (e.g. $c_1 * c_2$). All sets of equations, all having constant or linear terms only, are excluded from the concept of "Neugebauer equations". Preferentially, Neugebauer equations are polynomials that express color values in terms of bilinear, trilinear or quadratic colorant values. In a specific embodiment, Neugebauer equations are limited to the formulae for X, Y and Z given under the title "The Neugebauer equations" in the background of the invention, which are referred to as trilinear equations.

By a 2-colorant space is meant the domain of a 2-ink process. In the invention GV95149, the color gamut was obtained by transforming the physical colorant boundaries to color space. For well-behaved processes, such as the cmyk offset printing press, the correct color gamut is obtained, but for some unconventional processes, certain colorant combinations may transform to colors in color space that fall outside the physical color gamut. In this invention all the other kinds of colorant boundaries are defined that map to possible boundaries of the color gamut.

Suppose that colors are represented in a 3-dimensional space. For 3-ink processes, only one other kind of boundaries has to be taken into account, i.e. the natural boundaries. In the case of more than three colorant, also a hybrid form of physical and natural boundaries may determine the boundaries of the color gamut.

However, the color gamut of an n-ink process corresponds in practice to the mapping of the physical and natural colorant boundaries. The extension of a color gamut calculation for a n-ink process with colorant limitations is also presented.

DETAILED DESCRIPTION OF THE INVENTION

Figure 1:
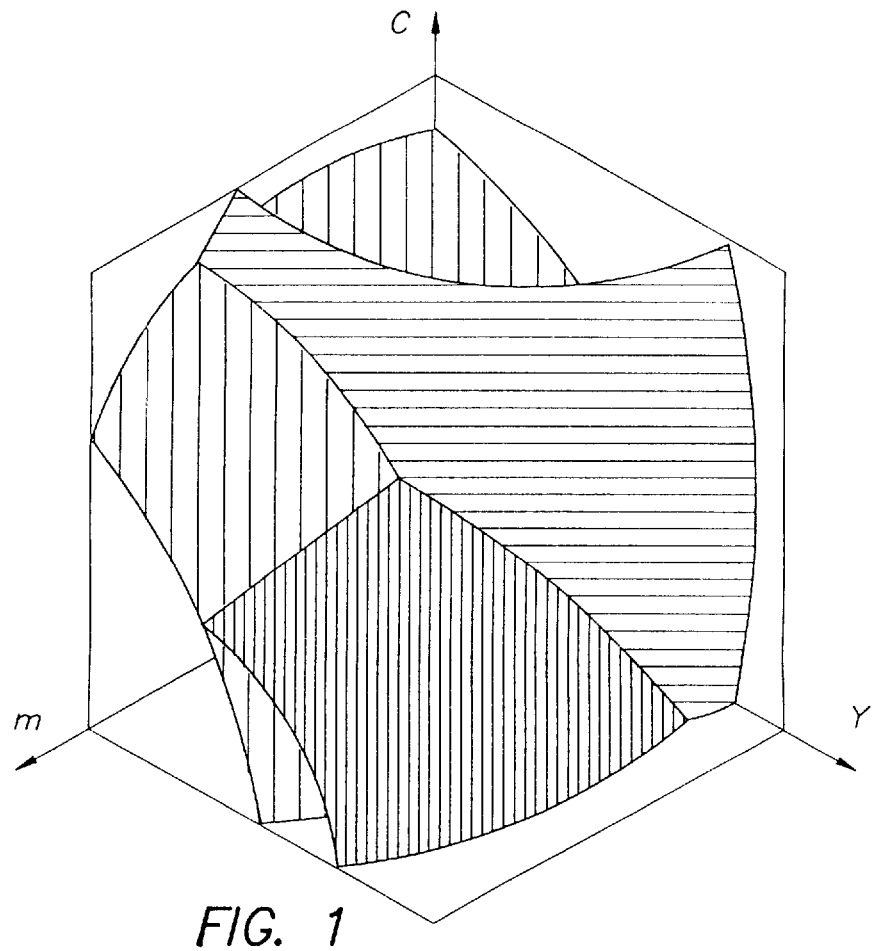

The invention is described hereinafter by way of examples with reference to the accompanying figure wherein:

FIG. 1 Surfaces in colorant space corresponding to constant tristimulus values for a cmy process modeled by the Neugebauer equations. The axis pointing to the right corresponds to y, the axis pointing to the left corresponds to m and the third axis pointing upwards is c.

Figure 2:
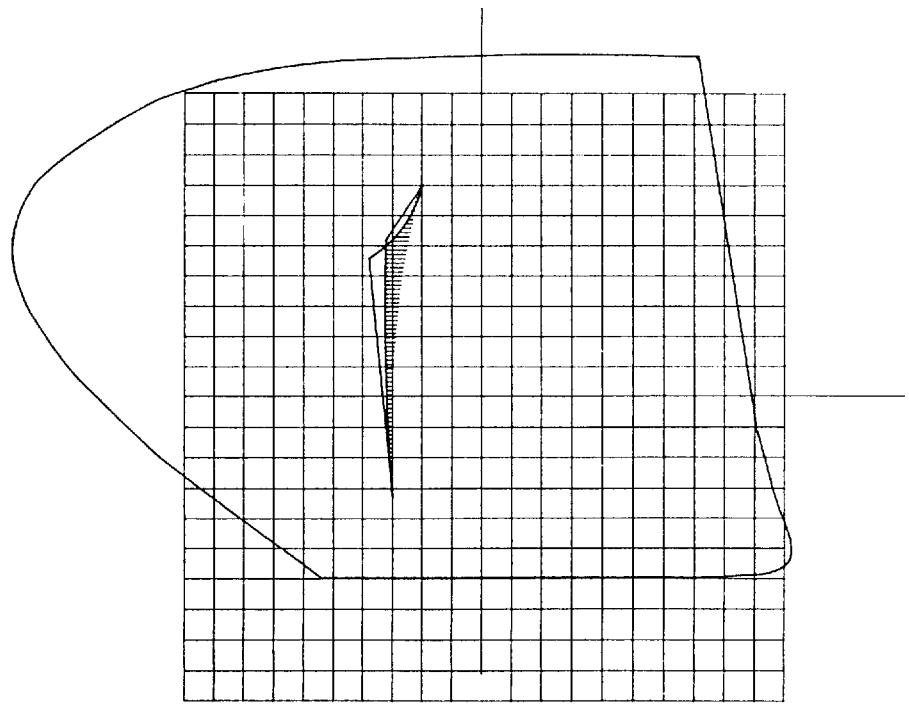

FIG. 2 Cross section of the color gamut in CIELAB of the process in Table 1 at L*=65. The solid lines correspond to the physical boundaries. The shaded area represents realizable colors outside the gamut defined by the physical boundaries. The distance between the grid lines corresponds to 10 CIELAB units. The horizontal and vertical lines are the a* and b* axes respectively.

Figure 3:
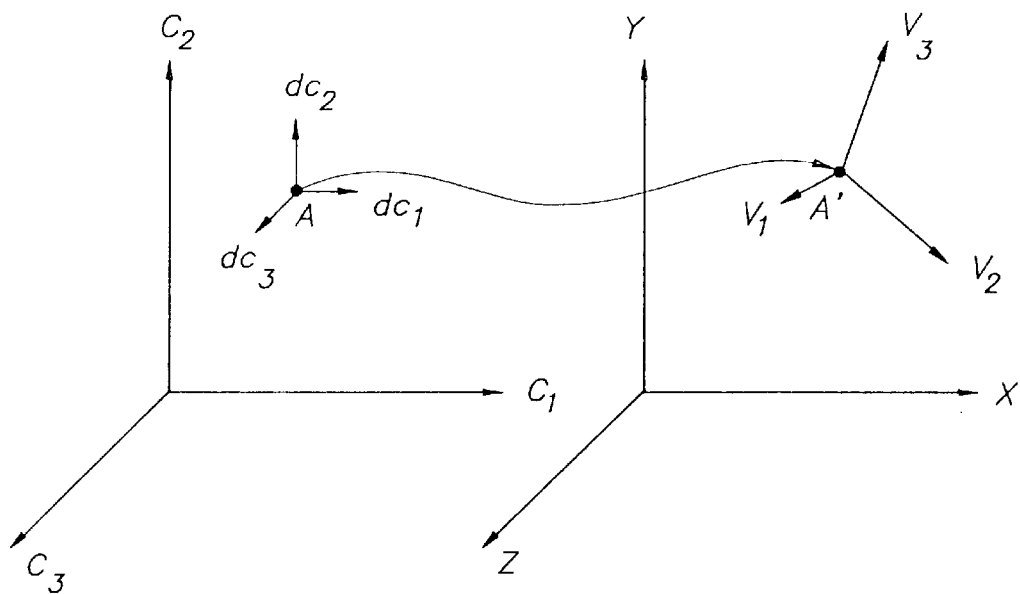

FIG. 3 Transformation of a point A in colorant space to the point A' in color space. The incremental colorant changes $\Delta c_1$, $\Delta c_2$ and $\Delta c_3$ induce color changes $V_1$, $V_2$ and $V_3$ respectively.

Figure 4:
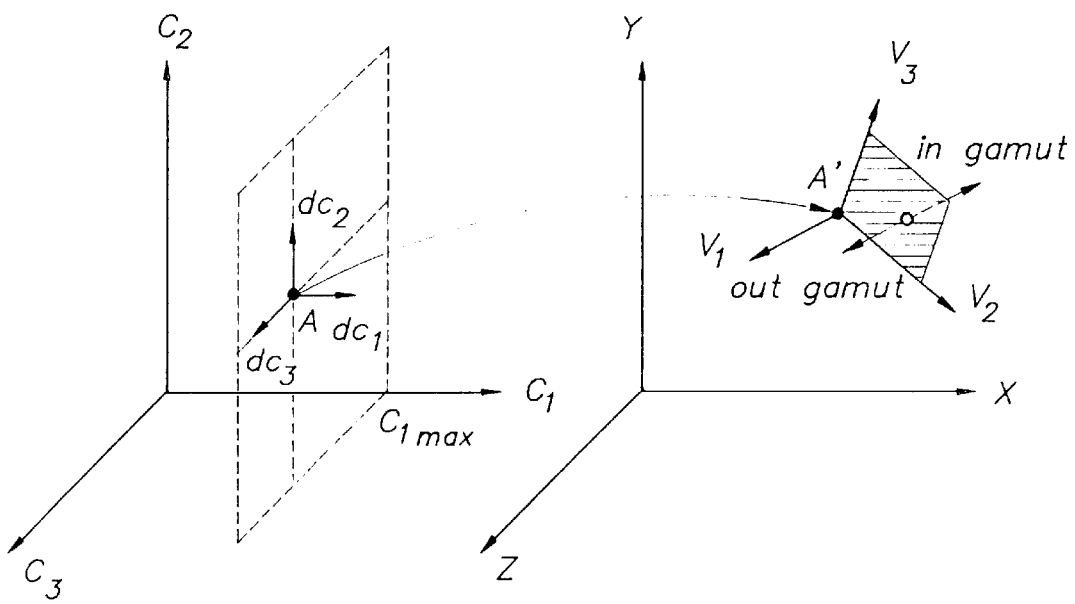

FIG. 4 Physical boundary of a three ink process where $c_1 = c_{1max}$. The color A' can only migrate according to the directions $V_2$ and $V_3$ or according to the direction of $V_1$ that corresponds to decrementing $c_1$.

Figure 5:
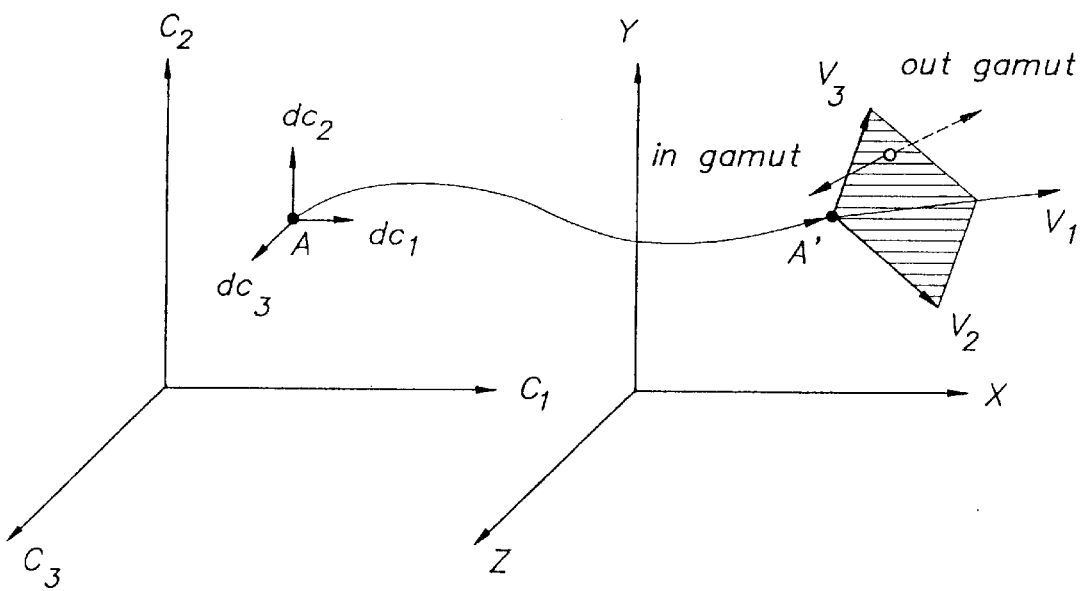

FIG. 5 Natural boundary of a three ink process. Any incremental change of the colorant values causes the color A to migrate in the plane defined by any two of the three linearly dependent vectors $V_1$, $V_2$ and $V_3$.

Figure 6:
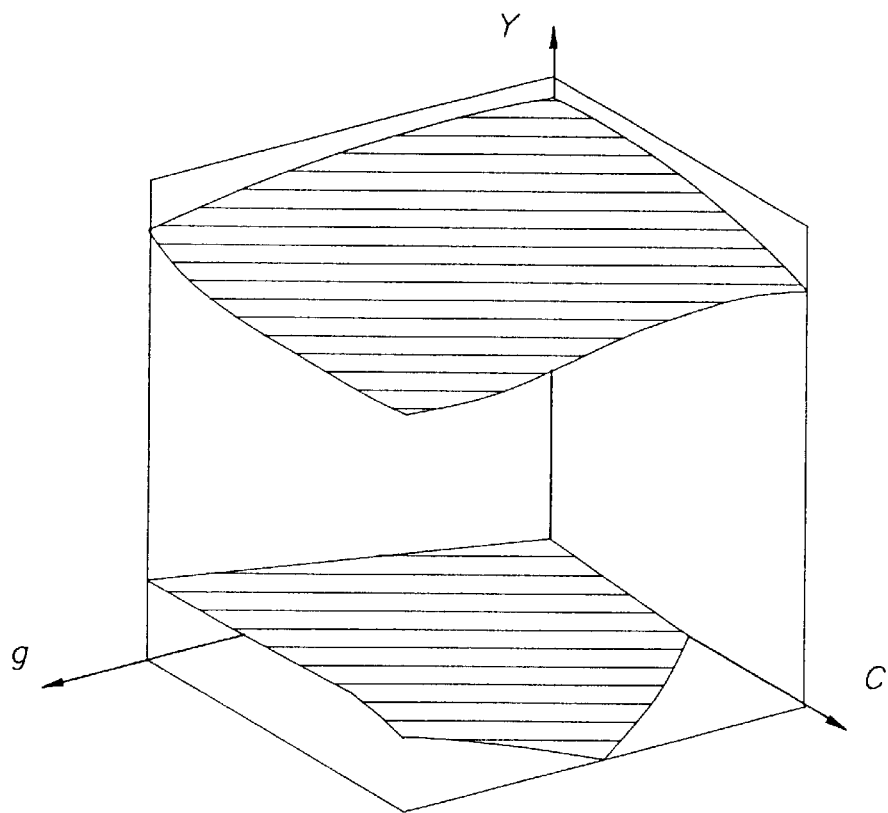

FIG. 6 Two natural boundaries in the $c_1c_2c_3$ colorant space of the process of which the Neugebauer primaries are given in Table 1. Only the lower surface passes through the colorant domain. The axis pointing to the right corresponds to c, the axis pointing to the left corresponds to g and the third axis pointing upwards is y.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

Color Gamut Description

A color gamut is completely determined if its boundaries in color space are known. This means that methods have to be found to describe these boundaries. If we assume that the dimension of the color space is n-dimensional, the dimension of the boundaries is n-1.

If for example colors are specified in tristimulus spaces, or any related transformation of such tristimulus values, the color space will be 3-dimensional, and as a result the boundaries will be 2-dimensional or surfaces. A complete description of the gamut in color space is obtained if all the boundary surfaces are described.

Another way to represent color gamuts is obtained by intersecting the color gamut with a number of surfaces. In this case the color gamut is described with contours.

Color Gamut Boundaries of a 3-ink Process

Because the relations between color and colorant are continuous functions and because the domain of the physically achievable colorant is connected in colorant space, the resulting gamut in color space is also connected. In a 3-dimensional color space, the transformation of the colorant of an ink process with more than two colorant is a volume in color space. The gamut is completely determined if its boundary surfaces are known in color space. Due to the continuous relations between color and colorant, boundary surfaces in colorant space have to be searched for that map on the color gamut boundaries in color space.

Physical Boundaries

Intuitively, one might think that the gamut boundaries in colorant space transform to the gamut boundaries in color space. For a 3-ink process, the gamut in colorant space is a cube. Each of the six planes that form the boundaries of such a cube correspond to a 2-ink process in which the third ink is kept constant at either the minimum or maximum value of its physical range. Therefore the term physical boundaries is introduced to indicate that these boundaries correspond to the physical limitations on the amounts of ink that can be printed.

It is possible to indicate that, assuming that a color can be rendered by only one set of colorants, the physical boundaries indeed correspond to boundaries in color space. This is demonstrated by means of FIGS. 3 and 4. For a point A inside the colorant gamut, there exists a corresponding point A' in color space. The Neugebauer equations are allowed to be linearized for incremental changes of the inks, and hence does a small change $dc_1$ of the ink $c_1$ correspond to a change in color space that can be characterized by a vector $V_1$. Similarly does a change of the other two inks $c_2$ and $c_3$ result in color changes $V_2$ and $V_3$. Change of an ink $c_i$ in the opposite direction results in a color change opposite to the corresponding vector $V_i$.

If, however, the point A lies on a boundary of the colorant gamut, as in FIG. 4 where A lies in the colorant plane with $c_1 = c_{1max}$, then the corresponding color A' can only be changed in the plane defined by the vectors $V_2$ and $V_3$, and for negative changes of $V_1$. As a result, only migrations to half of the color space can be achieved by altering colorant and from this follows that the point A' is indeed a point of the color gamut boundary. If the Neugebauer equations are used as a printing model, it is shown in the invention GV95149 that the physical boundaries have the shape of quadric surfaces in color space. The cross section of such surfaces with any other plane yields a conic section and this is in the invention GV95149 the basis of the analytical method to calculate gamut descriptors consisting of, for example, slices with constant Y values.

Natural Boundaries

For well-behaved three ink processes, such as the cmy offset printing press, the boundaries of the color gamut are indeed obtained by transforming the six boundary planes of the colorant gamut to color space, and hence the color gamut boundaries do correspond to the physical boundaries.

It was found, however, that for certain unconventional printing processes, colorant combinations can be found inside the colorant gamut that are yet transformed into colors that fall outside the physical color gamut. The latter can only mean that in such cases the "real" color gamut has to be larger than the physical color gamut, and that additional boundary surfaces have to be looked for that define the color gamut and that go through the colorant gamut. These additional boundary surfaces are introduced here and are called natural boundaries, as they relate more to the way that color is created in the printing process than to limitations on the realizable range of the colorant.

The derivation of the natural boundaries is as follows. If the color A' in FIG. 3 lies inside the color gamut, then this means that an incremental color change can be achieved in any direction by means of an appropriate selection of three colorant changes ($dc_1$, $dc_2$, $dc_3$). Inversely, if the color A' lies on the boundary of the color gamut, this means, by definition, that migrations from this color are not possible in any direction. A first example of such a situation are the physical boundaries. A second possible situation is depicted in FIG. 4: because the three vectors $V_1$, $V_2$ and $V_3$ happen to lie in a plane, only incremental color migrations within this plane are possible, and hence is the point A' part of a natural boundary. The surface itself is found by working out the condition that the three vectors $V_1$, $V_2$ and $V_3$ are to lie in a plane, or—which is equivalent—that they be linearly dependent.

The XYZ components of the color change $V_1$ caused by the colorant deviation $dc_1$ are expressed by:

$$V_1 = \left( \frac{\partial X}{\partial c_1}, \frac{\partial Y}{\partial c_1}, \frac{\partial Z}{\partial c_1} \right)$$

and similarly are the XYZ components of the color changes $V_2$ and $V_3$ given by:

$$V_2 = \left( \frac{\partial X}{\partial c_2}, \frac{\partial Y}{\partial c_2}, \frac{\partial Z}{\partial c_2} \right)$$

$$V_3 = \left( \frac{\partial X}{\partial c_3}, \frac{\partial Y}{\partial c_3}, \frac{\partial Z}{\partial c_3} \right)$$

The condition that the three vectors $V_1$, $V_2$ and $V_3$ are to be linearly dependent translates into requiring that the following determinant of the Jacobian Matrix, "Jacobian," be set to zero:

$$det \begin{pmatrix} \frac{\partial X}{\partial c_1} & \frac{\partial Y}{\partial c_1} & \frac{\partial Z}{\partial c_1} \\ \frac{\partial X}{\partial c_2} & \frac{\partial Y}{\partial c_2} & \frac{\partial Z}{\partial c_2} \\ \frac{\partial X}{\partial x_3} & \frac{\partial Y}{\partial c_3} & \frac{\partial Z}{\partial c_3} \end{pmatrix} = 0$$

If the Neugebauer equations are used and $c_1$ and $c_2$ are considered as parameters, the above expression leads to a quadratic function in $c_3$:

$$c_3^2(k_0 + k_1 c_1 + k_2 c_2 + k_{12} c_1 c_2) +$$
$$c_3(l_0 + l_1 c_1 + l_{11} c_1^2 + l_{112} c_1^2 c_2 + l_2 c_2 + l_{22} c_2^2 + l_{122} c_1 c_2^2 + l_{12} c_1 c_2) +$$
$$(m_0 + m_1 c_1 + m_{11} c_1^2 + m_{112} c_1^2 c_2 +$$
$$m_2 c_2 + m_{22} c_2^2 + m_{122} c_1 c_2^2 + m_{12} c_1 c_2) = 0$$

This indicates that for every couple $(c_1, c_2)$ a set of two values $c_3$ can be found that meet the equation. If these two values of $c_3$ are real and at least one of the two colorant combinations $(c_1, c_2, c_3)$ belongs to the colorant gamut, the corresponding color belongs to such a natural boundary. The sets of two solutions $c_3$ that correspond to couples $(c_1, c_2)$ form two natural boundary surfaces. FIG. 5 shows two natural boundary surfaces of the process of which the Neugebauer primaries are given in Table 1.

It may look contradictory at first that the actual color gamut of a printing process can be larger than what is predicted by the physical boundaries, and hence, that a color on a physical boundary sometimes lies inside the color gamut. This paradox can only be explained by the presence of at least one other colorant combination that renders that same color and does not lie on a physical boundary nor on a natural boundary. In that case colorant changes can be found indeed that result in color changes in any direction, including in a direction that goes beyond the limits set by the first colorant combination. The above reasoning demonstrates that a close relationship exists between the presence of multiple colorant solutions for certain colors and the occurrence of natural boundaries.

In order to demonstrate the previous, Table 2 shows a number of examples based on the separation of colors for the printing process presented in Table 1. The first seven columns contain an index, followed by the XYZ and CIELAB values of a color of particular interest. The last three columns represent the colorant combination(s) that correspond to these colors. A first color "1" is a very special case in that it can be rendered with two colorant combinations that each lie on a physical boundary. This color is the "cross point" of the two physical boundaries in FIG. 2. Color "2" also lies on a physical boundary, but can be rendered with only one colorant combination. The color "3" is the most "normal" case since it lies inside the physical boundary and can be separated into just one set of colorant. Color "4" provides an example of a color that lies on a physical boundary, yet this physical boundary lies inside the color gamut. As expected this color can be separated into two sets of colorant: one of course lies on the physical boundary, the other one does not. Color "5" lies outside the physical boundary yet inside the natural boundary of the process and can be separated into two sets of colorant. Finally the last color lies on the natural boundary that forms the "real" gamut boundary of this printing process. In the above example, a physical boundary was found that falls partially within the color gamut. There is no reason why the opposite could not happen, namely that a natural boundary would fall within the color gamut. In general, the color gamut of a 3-ink process is obtained by calculating both the physical and the natural boundaries, and taking the envelope of both of them.

TABLE 2

Dot percentage of the ink process in Table 1 that result in the corresponding colors.

| | X | Y | Z | L* | a* | b* | y | g | c |
|---|---|---|---|---|---|---|---|---|---|
| 1 | 24.7 | 33.6 | 8.6 | 65.0 | −32.0 | 50.0 | 32 | 82 | 0 |
| | | | | | | | 97 | 0 | 61 |
| 2 | 23.3 | 33.6 | 11.9 | 65.0 | −38.4 | 40.0 | 0 | 84 | 11 |
| 3 | 24.0 | 33.6 | 11.9 | 65.0 | −35.0 | 40.0 | 15 | 78 | 14 |
| 4 | 24.6 | 33.6 | 11.9 | 65.0 | −32.5 | 40.0 | 27 | 71 | 18 |
| | | | | | | | 86 | 0 | 65 |
| 5 | 25.2 | 33.6 | 11.9 | 65.0 | −30.0 | 40.0 | 41 | 62 | 24 |
| | | | | | | | 80 | 14 | 57 |
| 6 | 25.7 | 33.6 | 11.9 | 65.0 | −27.8 | 40.0 | 64 | 40 | 40 |
| | | | | | | | 64 | 40 | 40 |

Color Gamut Boundaries of 4-ink Processes
Natural Boundaries

For a 4-ink process, an incremental change of the ink $c_i$ results in a color change represented by the vector $V_i$ in color space. A first kind of boundary originates if the 4 vectors $V_i$ corresponding to the 4 inks lie in one plane. This leads to the extension of the definition of a natural boundary as it was introduced for a 3-ink process. Mathematically, a natural boundary is encountered if the rank of the following matrix is lower than 3

$$\begin{pmatrix} \partial X/\partial c_1 & \partial X/\partial c_2 & \partial X/\partial c_3 & \partial X/\partial c_4 \\ \partial Y/\partial c_1 & \partial Y/\partial c_2 & \partial Y/\partial c_3 & \partial Y/\partial c_4 \\ \partial Z/\partial c_1 & \partial Z/\partial c_2 & \partial Z/\partial c_3 & \partial Z/\partial c_4 \end{pmatrix}$$

This is equivalent to $$det \begin{pmatrix} \partial X/\partial c_1 & \partial X/\partial c_2 & \partial X/\partial c_3 \\ \partial Y/\partial c_1 & \partial Y/\partial c_2 & \partial Y/\partial c_3 \\ \partial Z/\partial c_1 & \partial Z/\partial c_2 & \partial Z/\partial c_3 \end{pmatrix} = 0$$

and $$det \begin{pmatrix} \partial X/\partial c_1 & \partial X/\partial c_2 & \partial X/\partial c_4 \\ \partial Y/\partial c_1 & \partial Y/\partial c_2 & \partial Y/\partial c_4 \\ \partial Z/\partial c_1 & \partial Z/\partial c_2 & \partial Z/\partial c_4 \end{pmatrix} = 0$$

The first determinant contains terms with highest exponents $c^2_1 \, c^2_2 c^2_3 c^3_4$ and the second matrix contains terms with highest exponents $c^2_1 \, c^2_2 c^3_3 c^2_4$. In order to get more insight in the nature of this condition, $c_3$ and $c_4$ can be kept constant. This would lead to a set of two quadratic equations in $c_1$:

$$K_1 c^2_1 + L_1 c_1 + M_1 = 0$$

$$K_2 c^2_1 + L_2 c_1 + M_2 = 0$$

with $K_1, K_2, L_1, L_2, M_1, M_2$ polynomials in $c_2$. The solutions of both equations are given by:

$$c_1 = \frac{-L_1 \pm \sqrt{L_1^2 - 4K_1 M_1}}{2K_1}$$

$$c_2 = \frac{-L_2 \pm \sqrt{L_2^2 - 4K_2 M_2}}{2K_2}$$

Equalizing both solutions leads to a 11th degree polynomial. The roots of this polynomial belong to the natural boundary surface of the 4-ink process. Evaluation of a variety of 4-ink processes has indicated that this condition does not occur in practical situations. This is not totally unexpected as the coincidence of four vectors in a plane is even less likely to occur than the coincidence of three vectors in the 3-ink case. It is therefore safe to state that for the practical calculation of the color gamut of 4-ink processes the natural boundaries need not to be taken into account.

Hybrid Boundaries

From the previous paragraph it is clear that, for practical purposes, a point that lies inside the 4-dimensional colorant space never transforms onto a point of the color gamut boundary. This immediately limits the search for gamut boundaries to points on the boundaries of the four-dimensional colorant gamut. Boundaries in a 4-dimensional space are 3-dimensional. For a 4-ink process there are eight such colorant boundaries that correspond to the 3-ink boundary processes of the 4-ink process. Because any color that falls within the color gamut of one of these 3-ink processes automatically falls within the color gamut of the 4-ink process, gamut boundaries of the 4-ink process have to be searched for on the gamut boundaries of the eight 3-ink boundary processes. Therefore it suffices to take into account the natural and physical boundaries of the 3-ink boundary processes. In the case of a natural boundary of one of the eight 3-ink boundary processes, the color gamut limitation is also affected by the physical limitation on the fourth ink and hence do we prefer to call this a hybrid boundary.

Physical Boundaries

In the case of a physical boundary of one of the eight 3-ink boundary processes, the color gamut limitation is only due to physical restrictions on inks, including on the fourth one. The physical boundaries of a 3-ink process are 2-ink boundary processes, so the corresponding physical boundaries of the 4-ink process are also 2-dimensional with the third and fourth ink set at their minimum or maximum value.

For "well behaved" processes, such as the cmyk process, the color gamut is not affected by natural boundary conditions. In that case, the gamut is only defined by the physical boundaries, i.e. 24 different 2-ink boundary processes.

Color Gamut Boundaries of n-ink Processes

In the case of an n-ink process with n>4, also natural and hybrid boundary types have to be considered. However, in practice it is safe to take into account only the physical and natural boundaries of the 3-ink boundary processes. This means that the color gamut of an n-ink process is the union of the color gamuts of all its 3-ink boundary processes.

Color Gamut Descriptor

As the color gamut of an n-ink process is the union of the color gamuts of its 3-ink boundary processes, a color gamut descriptor for 3 colorant has to be presented. For a 3-ink process, only two kinds of boundary surfaces have to be taken into account, i.e. the physical and natural colorant boundaries. If a gamut descriptor consisting of a set of contours is used, for example the cross sections of the color gamut with equiluminance planes, only a method of the intersection with the natural planes has to be presented. The intersections of the physical boundaries with equiluminance planes is presented in the invention GV95149.

Neugebauer Model

If the printer is modeled with the Neugebauer equations, the natural boundary planes are described by $$A c^2_3 + B c_3 + C = 0$$

with $$A = k_0 + k_1 c_1 + k_2 c_2 + k_{12} c_1 c_2$$

$$B = 1_0 + 1_1 c_1 + 1_{11} c^2_1 + 1_{112} c^2_1 c_2 + 1_2 c_2 + 1_{122} c_1 c^2_2 + 1_{12} c_1 c_2 c_3$$

$$C = m_0 + m_1 c_1 + m_{11} c^2_1 + m_{112} c^2_1 c_2 + m_2 c_2 + m_{22} c^2_2 + m_{122} c_1 c^2_2 + m_{12} c_1 c_2$$

Hence there are two solutions for $c_3$, i.e.
As a result there will be two surfaces in colorant space, one for $$c_3 = \frac{-B \pm \sqrt{B^2 - 4AC}}{2A}$$

the +sign and one for the −sign, i.e. the two natural sign boundaries. Per natural sign boundary, the $c_1 c_2$ domain is sampled and the corresponding value for $c_3$ is calculated. If the $c_1$ $c_2$ domain is sampled per percentage, the $c_1$ $c_2$ combinations can be represented with a gray value image with 101 rows and 101 columns. The gray value is equal to the corresponding $c_3$ value. In a second step the pixel values are replaced by the luminance value. This value is obtained by evaluating the Y-Neugebauer equation for the colorant values corresponding to the $c_1$ $c_2$ position and the corresponding $c_3$ value. The intersection of the natural boundary plane with a constant luminance plane is obtained by thresholding the image with the given luminance value and detecting the contours by making use of a contour follower. This results in contours in the 3-dimensional colorant space, that are transformed into the luminance plane by making use of the Neugebauer equations. The envelope of these contours and the contours obtained by intersecting the physical color boundaries with the luminance plane gives the intersection of the color gamut of the 3-ink process for the given luminance plane.

Localized Neugebauer Model

The gamut of a 3-ink process modeled with the localized Neugebauer model is obtained by taking the union of the gamuts of all the Neugebauer cells. Because each Neugebauer cell is modeled with the Neugebauer equations for three colorant, the gamut calculation in the previous paragraph can be used to determine its color gamut.

General Printer Model

Any printer model can be approximated by making use of the localized Neugebauer equations with any accuracy if a sufficient number of Neugebauer cells are used. Therefore it is possible to determine the color gamut of any printer model by approximating this model with the localized Neugebauer equations and determining the color gamut for these equations.

Color Gamut Descriptor with Linear Colorants Limitations

If a number of linear colorant limitations are given, the color gamut of an n-ink process is the union of the color gamuts of its 3-ink boundary processes and the linear colorant limitations are inherited by each 3-ink boundary process. In this case not only the physical and natural boundary planes have to be evaluated, but also an additional 2-ink process as defined in the invention GV95149. Nevertheless, in this invention only the intersection of the natural boundaries with for example a constant luminance plane should be determined.

Neugebauer Model

In the case of the Neugebauer model, the procedure presented in the previous section can be applied, but in this case the contour follower has to be limited to these pixels for which the colorant values $c_1 c_2 c_3$ are inside the colorant gamut.

Localized Neugebauer Model

To determine the gamut of a printer modeled with the localized Neugebauer equations, the union of the color gamuts of the Neugebauer cells is taken. The linear colorant limitations are inherited by these cells in the usual way. Hence only Neugebauer cells are considered that are at least partially in the colorant gamut. Per Neugebauer cell a Neugebauer process is given for three colorant and a number of linear colorant limitations inherited by the 3-ink process. Its color gamut can be determined by using the procedure presented in the previous paragraph.

General Printer Model

Any printer model can be approximated by making use of the localized Neugebauer equations with any accuracy if a sufficient number of Neugebauer cells are used. Therefore it is possible to determine the color gamut of any printer model by approximating this model with the localized Neugebauer equations and determining the color gamut for these equations, taking into account the linear colorant limitations.

Color Gamut Descriptor with Colorants Limitations

To determine the color gamut of an n-ink process, the 3-ink boundary processes are calculated and the colorant limitations are inherited by these 3-ink processes. The union of the color gamuts of the 3-ink boundary processes result in the color gamut of the n-ink process.

The problem that has to be solved now is the calculation of the color gamut with non-linear colorant limitations of a 3-ink process. In general it is not possible to solve this problem analytically as in the case of linear colorant limitations. Therefore the volume of the allowable colorant combinations in colorant space is approximated with surfaces that can be treated analytically. For example, in the case of localized Neugebauer equations, the boundary of the allowable colorant combinations can be approximated with planes.

One possibility is to use a rather fine grid in colorant space for the localized Neugebauer equations. Each cell can be seen as a voxel, with which the allowable colorant combinations are approximated. For each voxel/Neugebauer cell that falls mainly within the allowable colorant combinations, the color gamut is determined and the color gamut of the 3-ink process is the union of the color gamuts of these voxels. In this case the colorant gamut is approximated with planes that are 2-ink boundary processes of Neugebauer cells. Another solution is to use a more sparse grid for the LNE, and approximating the colorant gamut with planes in a number of Neugebauer cells. In this case some cells fall completely outside the colorant gamut, some fall completely inside the colorant gamut and for the remaining cells only a part delimited by a linear colorant limitation belongs to the colorant gamut. The union of the color gamuts of these last two types of Neugebauer cells, results in the color gamut of the 3-ink process.

In the case of a general printer model, this model is preferentially approximated by a localized Neugebauer model. The color gamut of this model corresponds to the color gamut of the general printer model.

Limitation on the Number of Simultaneously Printed Colorants

The color gamut of processes in which a color can only be obtained with a limited number of colorant can be determined by making use of the procedures presented in the invention GV95149.

In most practical situations, the number of simultaneously printed colorant is limited. A typical example is hifi-color printing with 7 inks. It is almost impossible to construct a model for 7 inks because too many colorant combinations have to be printed and measured. Therefore the printer model of an n-ink process consists of a number of submodels, that each represent the printer for a limited number of colorant. In the case of hifi-color printing, the process could be modeled with a number of 4-ink processes, and as a result the color gamut is the union of the color gamuts of these 4-ink processes. In general, if an n-ink process is modeled with a number of m-ink processes with m<n, the color gamut is the union of the color gamut of the m-ink processes. If there are colorant limitations for the n-ink process, they are inherited by the m-ink processes.

If however, a model is available for the n-ink process, and only m inks may be printed simultaneously, only m-ink boundary processes of the n-ink model are taken for which the remaining n-m inks are equal to 0%. The color gamut of the n-ink process is the union of the color gamuts of these m-ink boundary processes.

Having described in detail preferred embodiments of the current invention, it will now be apparent to those skilled in the art that numerous modifications can be made therein without departing from the scope of the invention as defined in the following claims.

I claim:

1. Method for obtaining a description of a color gamut for a color reproduction device, describing said color gamut by a plurality of closed contours, each situated on one surface in color space, comprising the following steps:

characterizing said color reproduction device by a printer model for transforming a set of colorant values in colorant space to a set of color values in color space;

extracting at least one 3-ink process from said printer model;

per extracted 3-ink process, determining a 3-ink printer model of said extracted 3-ink process, determining a Jacobian of said 3-ink printer model, determining a determinant of said Jacobian, and determining at least one surface in colorant space by setting said determinant to zero;

per extracted 3-ink process determining a plurality of curves in colorant space, each curve being based upon; said printer model;
one surface in color space; and,
at least one colorant boundary or at least one colorant limitation or at least said surface in said colorant space;

transforming each curve to a contour segment in color space, according to said printer model;

per extracted 3-ink process taking an envelope of all the contour segments in color space to form at least one closed contour;

taking a union of said closed contours from extracted 3-ink processes.

2. Method according to claim 1, wherein said curve is determined by evaluation of a function in colorant space or by a method comprising the steps of:

establishing a plurality of samples in a 2-colorant space;

computing from each sample at least one value according to said printer model;

finding said curves in colorant space by following contour lines having the same level for said computed value.

3. Method according to claim 1, wherein transforming said curve comprises the steps of:

sampling said curve to obtain a plurality of samples in colorant space;

transforming each sample to color space, according to said printer model.

4. Method according to claim 1, wherein the colorant values are limited to a colorant gamut and the process of determining a curve in colorant space comprises the following steps:

determining at least one 2-ink process from said printer model;

determining at least one 1-ink process from each determined 2-ink process;

in each determined 1-ink process, determining at least one set of colorant values, within said colorant gamut;

constructing said curve in colorant space, having two sets of colorant values, belonging to one 2-ink process, as endpoints.

5. Method according to claim 1, wherein said printer model is based on Neugebauer equations or localised Neugebauer equations.

6. Method according to claim 1, wherein at least one colorant limitation is imposed on said colorant, further comprising the steps of:

expressing said colorant limitation by an equation in two variable colorant values;

establishing at least one endpoint of a curve in colorant space making use of said equation.

* * * * *